(12) United States Patent
McConnell et al.

(10) Patent No.: US 10,844,939 B2
(45) Date of Patent: Nov. 24, 2020

(54) REDUCED VOLUME TORQUE CONVERTER HAVING INVERTED COVER CLOSURE

(71) Applicants: Trevor McConnell, Wooster, OH (US); Daniel Linton, North Canton, OH (US); Jeffrey Trares, Ravenna, OH (US)

(72) Inventors: Trevor McConnell, Wooster, OH (US); Daniel Linton, North Canton, OH (US); Jeffrey Trares, Ravenna, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 278 days.

(21) Appl. No.: 15/776,227

(22) PCT Filed: Dec. 18, 2015

(86) PCT No.: PCT/US2015/066620
§ 371 (c)(1),
(2) Date: May 15, 2018

(87) PCT Pub. No.: WO2017/105481
PCT Pub. Date: Jun. 22, 2017

(65) Prior Publication Data
US 2020/0256440 A1 Aug. 13, 2020

(51) Int. Cl.
*F16D 41/28* (2006.01)
*F16H 45/02* (2006.01)
(Continued)

(52) U.S. Cl.
CPC .......... *F16H 41/28* (2013.01); *F16H 45/02* (2013.01); *F16H 2041/243* (2013.01); *F16H 2045/0205* (2013.01); *F16H 2045/0221* (2013.01)

(58) Field of Classification Search
None
See application file for complete search history.

(56) References Cited

U.S. PATENT DOCUMENTS 3,024,735 A    3/1962  Zeidler
5,813,505 A *  9/1998  Olsen ...................... F16H 45/02
                                              192/200
(Continued)

FOREIGN PATENT DOCUMENTS

CN    104389977 A     3/2015
DE    112016002773 T5 3/2018
(Continued)

OTHER PUBLICATIONS

International Search Report for PCT/US2015/066620, Completed by the Korean Patent Office on Sep. 7, 2016, 3 Pages.

*Primary Examiner* — Colby M Hansen
(74) *Attorney, Agent, or Firm* — LeKeisha M. Suggs (57) ABSTRACT

A housing for a torque converter comprising: an axis of rotation; a cover including: a first inner surface; a first outer surface opposite the first inner surface; a first axially extending necked portion radially outward relative to the axis of rotation and parallel to the axis of rotation, an impeller shell non-rotatably connected to the cover and having: a second inner surface; a second outer surface opposite the second inner surface; a second axially extending necked portion radially outward relative to the first axially extending necked portion; a line orthogonal to the axis of rotation passes through the first and second axially extending necked portions; and, a weld fixedly securing the first inner surface to the second inner surface at at least one point on the line. A torque converter including such a housing closure is also described.

20 Claims, 4 Drawing Sheets

(51) Int. Cl.
  *F16H 41/28*     (2006.01)
  *F16H 41/24*     (2006.01)

(56) References Cited

U.S. PATENT DOCUMENTS

| | | | | |
|---|---|---|---|---|
| 6,026,941 | A | * | 2/2000 | Maienschein ........... F16H 41/24 |
| | | | | 192/3.29 |
| 2001/0008197 | A1 | | 7/2001 | Maienschein et al. |
| 2002/0040835 | A1 | | 4/2002 | Fukukawa et al. |
| 2002/0195305 | A1 | | 12/2002 | Krause et al. |
| 2009/0071138 | A1 | | 3/2009 | Buedenbender et al. |
| 2009/0223767 | A1 | | 9/2009 | Arhab et al. |
| 2012/0181130 | A1 | * | 7/2012 | Fukunaga ................ F16H 45/02 |
| | | | | 192/3.25 |
| 2013/0056319 | A1 | * | 3/2013 | Lindemann ......... F16D 25/0638 |
| | | | | 192/3.29 |
| 2015/0036069 | A1 | * | 2/2015 | Xue .................... G02F 1/13306 |
| | | | | 349/39 |
| 2016/0290461 | A1 | * | 10/2016 | Momiyama ............ B23K 26/28 |
| 2016/0369878 | A1 | | 12/2016 | Dattawadkar et al. |

FOREIGN PATENT DOCUMENTS

| | | |
|---|---|---|
| EP | 1900468 B1 | 9/2013 |
| JP | 2011069464 A | 4/2011 |
| WO | 2015100017 | 7/2015 |

\* cited by examiner

PRIOR ART
Fig. 5

REDUCED VOLUME TORQUE CONVERTER HAVING INVERTED COVER CLOSURE

CROSS-REFERENCE TO RELATED APPLICATIONS

This application is the U.S. National Phase of PCT Appln. No. PCT/US2015/066620 filed Dec. 18, 2015, the entire disclosure of which is incorporated by reference herein.

FIELD

The present disclosure relates generally to torque converters and more specifically torque converters having an inverted cover closure for reducing fluid volume within the torque converter.

BACKGROUND

Figure 4:
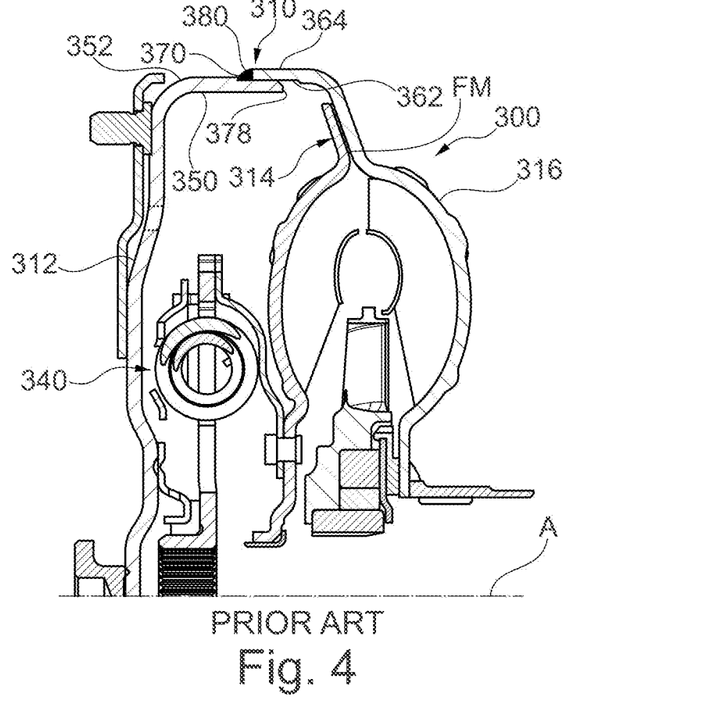
FIGS. 4 and 5 illustrates partial cross sectional side views of prior art torque converters.

FIG. 4 is a partial cross-sectional view of prior art torque converter 300. Torque converter 300 shows an integrated turbine piston 314 and conventional damper 340. Torque converter 300 includes cover 312 and impeller 316 joined at weld 370 to form housing 310. Cover 312 has inner surface 350, outer surface 352, and end 378 extending axially in direction AD2. Impeller shell 316 has inner surface 362, outer surface 364, and end 380 extending axially in direction AD1.

Figure 5:
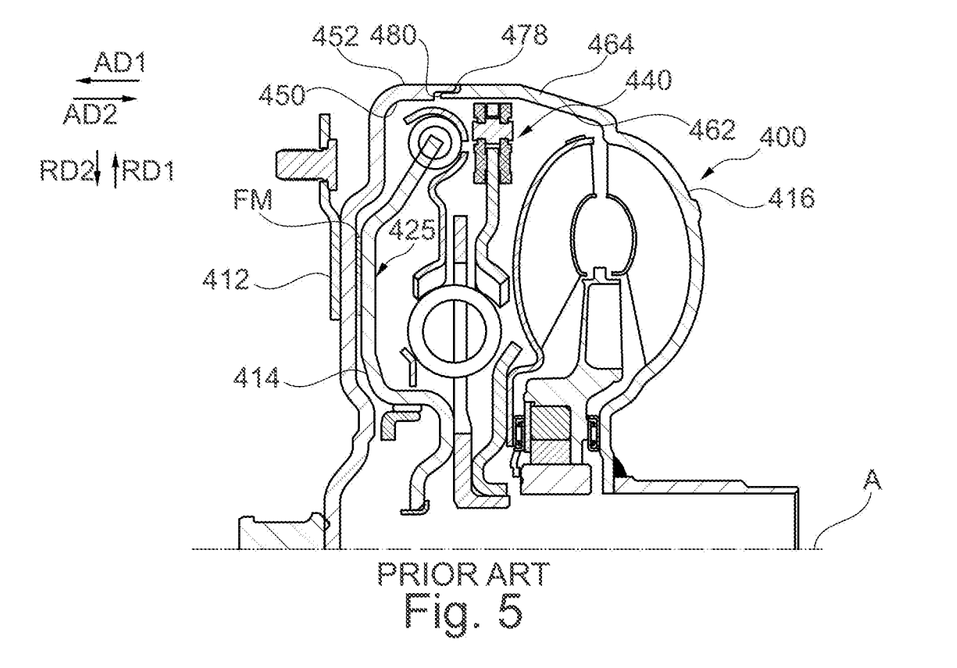

FIG. 5 is a partial cross-sectional view of prior art torque converter 400. Torque converter 400 shows a conventional piston 414 of clutch 425 and centrifugal pendulum absorber 440. Torque converter 400 includes cover 412 and impeller 416 joined to form housing 410. Cover 412 has inner surface 450, outer surface 452, and end 478 extending axially in direction AD2. Impeller shell 416 has inner surface 462, outer surface 464, and end 480 extending axially in direction AD1. Ends 478 and 480 are chamfered to interlock, thus inner surface 450 and 462 are generally aligned.

Previously, another particular stamped geometry for a torque converter cover and impeller closure has been disclosed with both components including a chamfered end for welding access. The cover includes a bulged area allowing for a radial dead stop surface and a cylindrical protrusion extending under the impeller for reduced weld contamination.

BRIEF SUMMARY

Example aspects broadly comprise a housing for a torque converter comprising: an axis of rotation; a cover including: a first inner surface; a first outer surface opposite the first inner surface; a first axially extending necked portion radially outward relative to the axis of rotation and parallel to the axis of rotation; an impeller shell non-rotatably connected to the cover and having: a second inner surface; a second outer surface opposite the second inner surface; a second axially extending necked portion radially outward relative to the first axially extending necked portion; a line orthogonal to the axis of rotation passes through the first and second axially extending necked portions; and, a weld fixedly securing the first inner surface to the second inner surface at at least one point on the line.

In an example aspect, the cover further comprises: a torus portion; and, a radial portion. In an example aspect, the cover further comprises: a first connecting portion connecting the first axially extending necked portion to the torus portion; and, a second connecting portion connecting the torus portion and the radial portion. In an example aspect, the impeller shell further comprises a clutch portion.

In an example aspect, the housing further comprises: the cover as described above further including: a torus portion; a first connecting portion connecting the first axially extending necked portion and the torus portion; a radial portion; and, a second connecting portion connecting the torus portion and the radial portion; the impeller shell further including a clutch portion; and, a gap including a pathway arranged for fluid communication disposed axially between the first connecting portion and the clutch portion. In an example aspect, the cover is of one-piece construction. In an example aspect, the impeller shell is of one-piece construction.

Other example aspects broadly comprise a torque converter comprising: the housing as described above, the cover further including a first torus portion; a turbine including a turbine shell having a third inner surface and a third outer surface and including a second torus portion; and, a gap including a pathway arranged for fluid communication disposed between the first and second torus portions.

Other example aspects broadly comprise a torque converter comprising: an axis of rotation; a cover arranged to receive torque, the cover including: a first inner surface; and, a first axially extending necked portion radially outward relative to the axis of rotation and parallel to the axis of rotation; an impeller shell including: a second inner surface; a second axially extending necked portion radially outward relative to the first axially extending necked portion; and, at least one blade fixedly secured to the impeller shell; a turbine including a turbine shell and at least one turbine blade fixedly secured to the turbine shell; a line orthogonal to the axis of rotation passing through the first and second axially extending necked portions; a weld fixing the first inner surface to the second inner surface at at least one point on the line. In an example aspect, the first axially extending necked portion includes a first end extending in a first axial direction and the second axially extending necked portion includes a second end extending in the first axial direction, wherein the second end is radially outward relative to the first end. In an example aspect, the impeller shell further includes a clutch. In an example aspect, the turbine shell further includes a piston arranged for engagement with the clutch. In an example aspect, the impeller shell including the clutch is of one-piece construction; and the turbine shell including the piston is of one-piece construction.

Other example aspects broadly comprise a torque converter comprising: an axis of rotation; a drive plate arranged for connecting to an engine via a stud; a cover fixedly attached to the drive plate and arranged to receive torque; the cover including a first axial portion parallel to the axis of rotation and disposed at a first radial distance relative to the axis of rotation and having: a first inner surface; a first distal end extending in a first axial direction to a first axial distance relative to the drive plate; an impeller including an impeller shell and at least one blade; the impeller shell further including a second axial portion parallel to the axis of rotation and disposed at a second radial distance greater than the first radial distance relative to the axis of rotation, and having: a second inner surface; a second distal end extending in the first axial direction to a second axial distance relative to the drive plate, the second axial distance greater than the first axial distance; a weld arranged to fixedly securing the first inner surface to the second inner surface; a turbine including a turbine shell and at least one blade; the turbine shell further including a turbine inner surface and a turbine outer surface opposite the turbine inner surface. In an example aspect, the weld is disposed in a step formed by the second distal end and the first inner surface. In an example aspect, the torque converter further comprises a damper wherein the first axial portion is radially outward relative to the damper. In an example aspect, the damper includes a centrifugal pendulum absorber, a series damper, a parallel damper, or a combination thereof. In an example aspect, the impeller shell includes a clutch and is of one-piece construction. In an example aspect, the turbine shell includes a piston and is of one-piece construction for engagement with the clutch. In an example aspect, the torque converter further includes a gap including a pathway arranged for fluid communication and is disposed between the cover and the turbine shell.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

By "non-rotatably connected" components we mean: any time one of the components rotates, all of the components rotate; and relative rotation between the components is not possible. Axial or radial displacement between components is possible, but not required.

The present disclosure provides a closure including a cover mated with an impeller shell to form a housing for a torque converter having reduced fluid volume as compared with conventional designs. Minimizing volume within some torque converter designs results in improved engagement speed and controllability while advantageously using less fluid to fill the volume, and therefore, resulting in less total torque converter mass. The proposed cover includes a closure weld geometry to connect the inner surface of the cover, arranged to face radially outward, to the inner surface of the impeller in a linear arrangement. The cover and impeller together form a closed chamber within the torque converter. Therefore, volume from inside the torque converter is transferred to outside the torque converter thus reducing total mass of the torque converter. The cover closure is referred to herein as 'inverted', or in other words, positioned upside down, reversed, or in the opposite position, order, or arrangement as a conventional closure for torque converter design.

Figure 1:
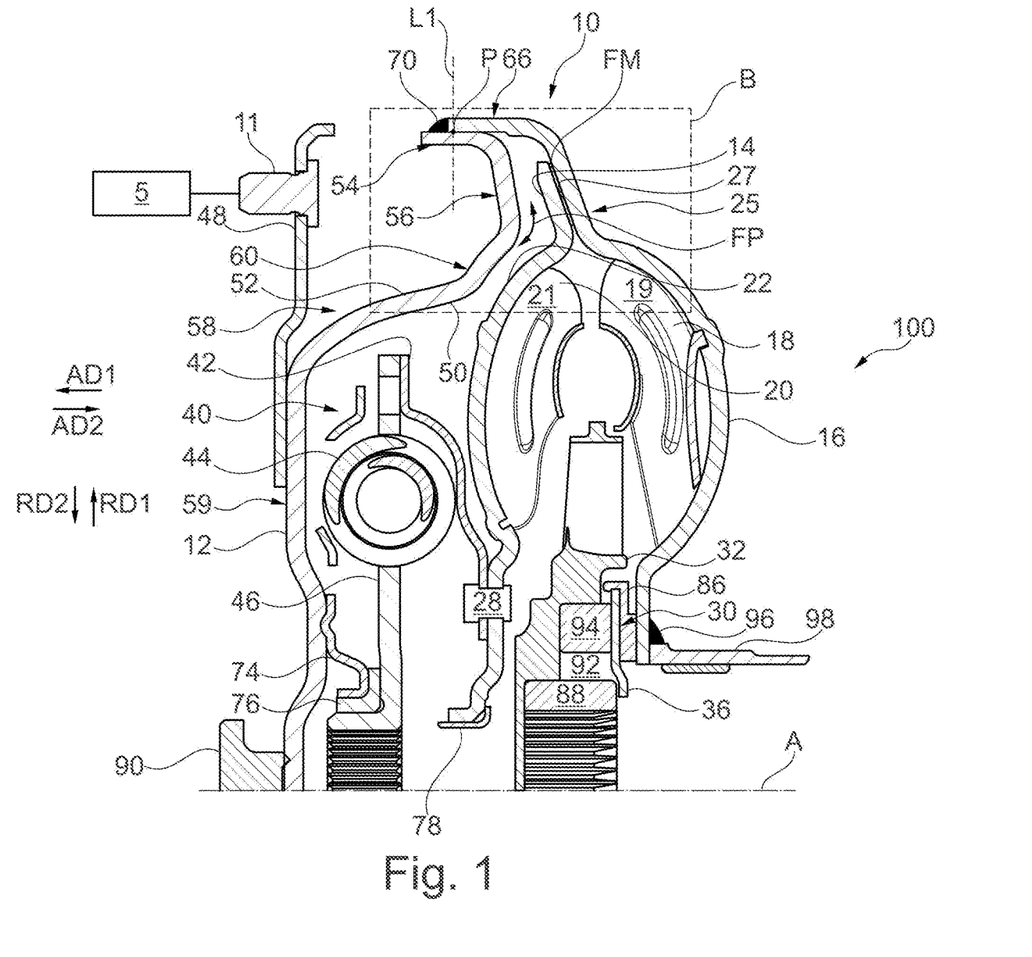
FIG. 1 illustrates a partial cross sectional side view of a torque converter with an inverted housing closure according to an example aspect.
Figure 2A:
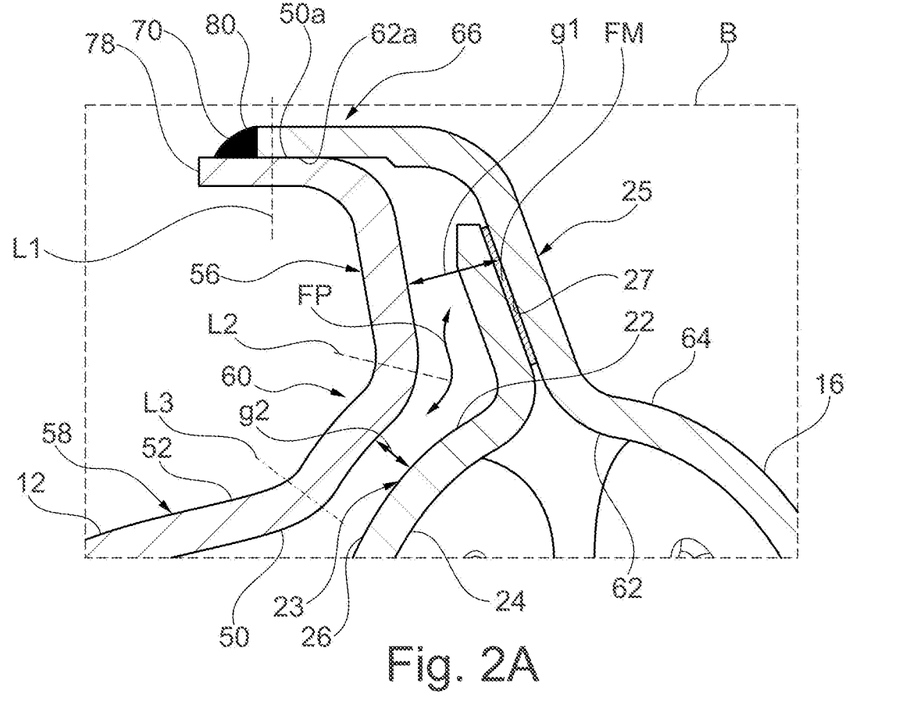
FIG. 2A illustrates a detailed view of Box B of FIG. 1.
Figure 2B:
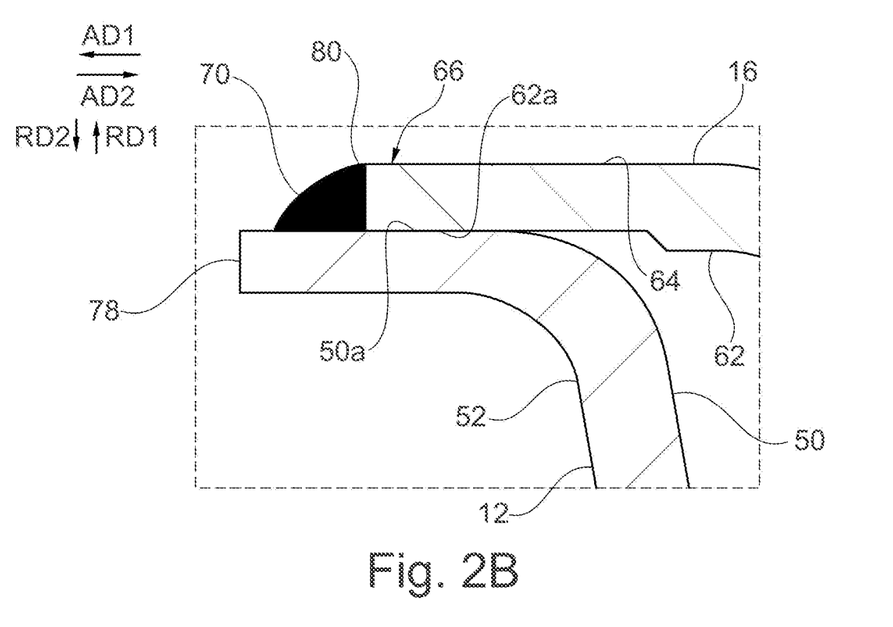
FIG. 2B illustrates a detailed view of the weld area of Box B of FIG. 2A according to an example aspect.
Figure 3:
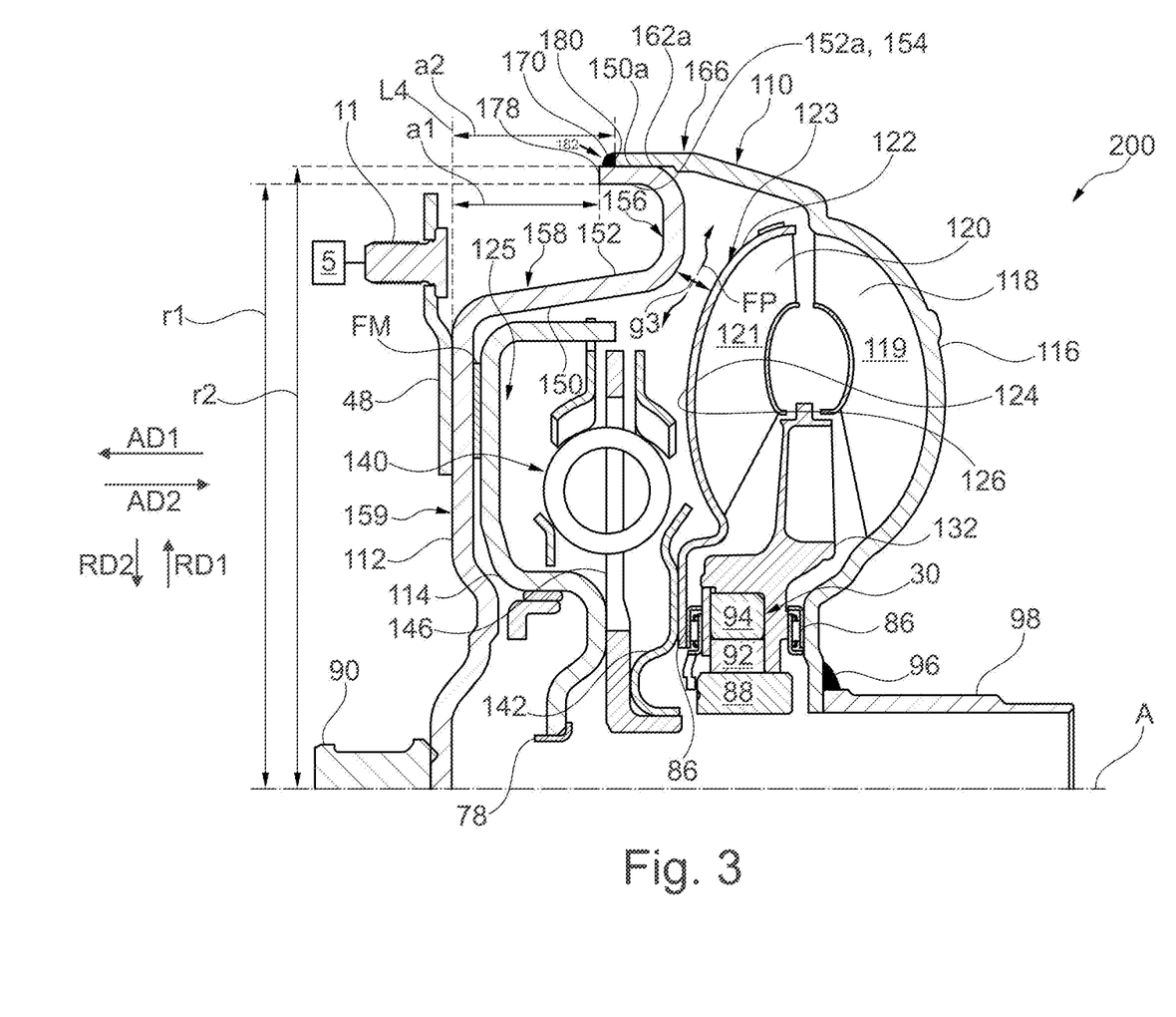
FIG. 3 illustrates a partial cross sectional side view of another torque converter according to an example aspect.

The following description is made with reference to FIGS. 1 through 3. FIG. 1 illustrates a partial cross sectional side view of a torque converter including an inverted housing closure as in an example aspect. Torque converter 100 includes front cover or simply 'cover' 12 for connecting to a crankshaft of an internal combustion engine 5 via drive plate 48 and lug 11, and impeller 18 including impeller shell 16, also referred to as rear cover interchangeably herein. Impellers are also referred to in the art interchangeably as 'pump'. Front cover 12 and impeller shell 16 are fastened together via weld 70 during final assembly to form housing 10. Cover 12 is fixed to cover pilot 90. Impeller 18 is fixed to impeller hub 98 via weld 96. Torque converter 100 also includes turbine 20, turbine shell 22, and stator 32 between turbine 20 and impeller 18. Turbines and impellers, as is known in the art, include a plurality of blades 21 and 19, respectively.

Torque converter 100 includes one-way clutch 30, which supports stator 32, and includes inner race 88, roller 92, and outer race 94, for example. Alternatively, one-way clutch 30 may comprise an inner race and rocker as is known in the art. Side plate 36 holds one-way clutch 30 in place within stator 32. Bearing 86 is disposed between side plate 36 and impeller shell 16.

In an example aspect, impeller shell 16 further comprises clutch portion 25. Torque converter 100 includes clutch 25 including impeller clutch portion 27 integrally formed with impeller shell 16 as shown in FIG. 1 in an example aspect. By integrally, it is meant that the impeller clutch portion is of singular, one-piece construction with impeller shell 16. Clutch 25 further includes piston 14, which is included in one-piece construction with turbine shell 22 as shown in FIG. 1 in an example aspect. Piston 14, included as singular, one-piece construction with turbine shell 22 as shown, is also referred to interchangeably herein as turbine piston 14 or integrated piston 14. Friction material FM is optionally attached to friction surface of piston 14, to impeller clutch 27, or to both.

Torque converter 100 also includes damper assembly 40, which is connected to and drivable by turbine 20, and is positioned between turbine 20 and front cover 12. Damper assembly 40 includes spring 44, damper flange 46, and cover plate 42 fixed to turbine shell 22 via fastener or rivet 28. Damper assembly 40 optionally includes bushings 76 and 78 and thrust washer 74. In an example aspect, flange 46 axially thrusts against or is axially supported by cover 12 via bushing 76 supporting thrust washer 74. Torque converter 100 includes axis of rotation A, also simply referred to as axis A.

Torque converter 100 includes the inverted housing closure as shown in FIG. 1, and in further detail in FIGS. 2 and 3. Cover 12 includes inner surface 50 and outer surface 52, which is opposite inner surface 50. Cover 12 is singularly formed to include axially extending necked portion 54, torus portion 60 and radial portion 59 as well as connecting portions 56 and 58. 'Singularly formed', alternatively 'integrally formed' as used interchangeably herein, is meant specifically to denote one-piece construction. In other words, the aforementioned portions pertain to a cover of one-piece construction. In an example aspect, cover 12 is stamped; however, other methods as known in the art may be used for forming.

As described in greater detail in FIG. 2 showing expanded view of Box B of FIG. 1, axially extending necked portion 54 of cover 12 includes end 78. "Axially extending necked portion' is also referred to as 'axial portion' interchangeably herein. End 78, or 'distal end' or 'end portion' 78 as referred to interchangeably herein, extends in axial direction AD1. In other words, end 78 extends axially away from turbine 20 and impeller 18 and toward drive plate 48. Axially extending necked portion 54 is radially outward relative to axis of rotation A and is parallel to axis A.

Impeller shell 16 is non-rotatably connected to cover 12 and includes inner surface 62 and outer surface 64, which is opposite inner surface 62. Impeller shell 16 includes axially extending necked portion 66, which is disposed radially outward relative to axially extending necked portion 54. Axially from extending necked portion 66 of impeller shell 16 includes end 80. End 80 or 'end portion' 80 also extends in axial direction AD1. In other words, end 80 extends axially away from turbine 20 and impeller 18 and toward drive plate 48. Axially extending necked portion 66 is radially outward relative to axially extending necked portion 54 and is parallel to axis A. Axially extending necked portions 54 and 66 fit snugly together, in other inner surface 50a contacts inner surface 62a or is only separated by thin layer of weld 70 that seeps or penetrates between surfaces 50a and 62a in order to weld or fix cover 12 to impeller shell 16 to form housing 10.

Line L1, as shown in FIGS. 1 and 2, is orthogonal to axis of rotation A and passes through first and second axially extending necked portions 54 and 66. Weld 70 fixedly secures inner surface 50a to inner surface 62a at at least one point on line L1. In other words, weld 70 is arranged to penetrate between inner surface 50a of axially extending necked portion 54, which faces radially outward, and inner surface 62a of axially extending necked portion 66, which faces radially inward.

In an example aspect, cover 12 includes connecting portion 56 connecting the axially extending necked portion 54 to torus portion 60; and, connecting portion 58 connecting torus portion 60 and radial portion 59. Portions 54, 56, 60, 58, and 59 are of singular, one-piece construction. Lines L2 and L3 of FIG. 2 schematically represent boundaries of torus portion 60; however, there are no physical boundaries or seams within cover 12, which is of one-piece construction.

In an example aspect cover 12 further includes gap g1 including a pathway FP arranged for fluid communication, which is disposed axially between connecting portion 56 and clutch portion 27 of impeller shell 16, wherein cover 12 and impeller shell 16 are of one-piece construction. In an example aspect, torque converter 100 comprises housing 10 as described above and turbine 20 including turbine shell 22 having inner surface 24 and outer surface 26 and including torus portion 23. Gap g2, including pathway FP arranged for fluid communication, is disposed between torus portions 60 and 23.

In an example aspect, torque converter 100 axially extending necked portion 54 includes first end 78 extending in axial direction AD1 and axially extending necked portion 66 includes end 80 extending in axial direction AD1, wherein end 80 is radially outward relative to end 78.

Referring to FIG. 3, torque converter 200 includes cover 112 for connecting to a crankshaft of an internal combustion engine 5 via drive plate 48 and lug 11, and impeller 118 including impeller shell 116. Cover 112 and impeller shell 116 are fastened together via weld 170 to form housing 110. Cover 112 is fixed to cover pilot 90. Impeller 118 is fixed to impeller hub 98 via weld 96. Torque converter 200 also includes turbine 120, turbine shell 122, and stator 132 between turbine 120 and impeller 118. Turbines and impellers, as is known in the art, include a plurality of blades 121 and 119, respectively.

Torque converter 200 includes one-way clutch 30, which supports stator 132, and includes inner race 88, roller 92, and outer race 94, and bearings 86, for example. In an example aspect, torque converter 200 includes clutch 125 including piston 114 acting upon cover radial portion 159 to engage clutch 125. Friction material FM is optionally attached to friction surface of piston 114, to cover radial portion 159, or to both.

Torque converter 200 also includes damper assembly 140, which is connected to and drivable by turbine 120, and is positioned between turbine 120 and cover 112. Damper assembly 140 includes spring 144, damper flange 146, and cover plate 142 fixed to turbine shell 122. Damper assembly 40 optionally includes bushing 78. Torque converter 200 includes axis of rotation A.

Torque converter 200 includes the inverted housing closure as shown in FIG. 3. Cover 112 includes inner surface 150 and outer surface 152, which is opposite inner surface 150. Cover 112 is singularly formed to include axially extending necked portion 154, radial portion 159 as well as connecting portions 156 and 158. 'Singularly formed', alternatively 'integrally formed' as used interchangeably herein, is meant specifically to denote one-piece construction. In other words, the aforementioned portions pertain to a cover of one-piece construction. In an example aspect, cover 112 is formed by stamping or other methods as known in the art.

Axial portion 154, of FIG. 3 for example, is radially outward relative to axis A and also parallel to axis A at radial distance r1 as measured from axis A to surface 152a. Axial portion 166 is radially outward relative to axial portion 154 and also parallel to axis A at radial distance r2 as measured from axis A to surface 162a. End 178 is disposed axially offset from end 180. In an example aspect, as measured from line L4 orthogonal to axis A and passing through the interface between cover radial portion 159 and drive plate 48, end 178 is axial distance a1 as measured from L4 and end 180 is axial distance a2 as measured from line L4. Axial distance a2 is greater than axial distance a1. The offset between ends 178 and 180 forms step 182 for weld 170. Weld 170 penetrates between faces 150a and 162a to fixedly attach axial portions 154 and 166. Gap g3 includes pathway FP for fluid communication between cover 112 and turbine shell 122.

In an example aspect, torque converter 100, 200 comprises axis of rotation A; drive plate 48 arranged for connecting to engine 5 via stud 11; cover 12, 112 fixedly attached to drive plate 48 and arranged to receive torque. Cover includes axial portion 54, 154 parallel to axis of rotation A and disposed at radial distance r1 relative to axis of rotation A. Cover 12, 112 includes inner surface 50a, 150a; distal end 78, 178 extending in axial direction AD1 to axial distance a1 relative to drive plate 48; impeller 18, 118 including impeller shell 16, 116 and at least one blade 19, 119; impeller shell 16, 116 further including axial portion 66, 166 parallel to axis of rotation A and disposed at radial distance r2, wherein radial distance r2 is greater than radial distance r1 relative to the axis of rotation A, and having: inner surface 62a, 162a; distal end 80, 180 extending in axial direction AD1 to axial distance a2 relative to drive plate 48, axial distance a2 greater than axial distance a1; weld 70, 170 arranged to fixedly secure inner surface 50a, 150a to inner surface 62a, 162a; turbine 20, 120 including turbine shell 22, 122 and at least one blade 21, 121; turbine shell 22, 122 further including turbine inner surface 24, 124 and turbine outer surface 26, 126 opposite turbine inner surface 24, 124.

In an example aspect, weld 70, 170 is disposed in step 82, 182 formed by end 80, 180 and first inner surface 50a, 150a. In an example aspect, axial portion 54, 154 is radially outward relative to the damper 40, 140. In an example aspect, damper 40, 140 includes centrifugal pendulum absorber (CPA), a series damper, a parallel damper, or a combination thereof, or other damper configurations as known in the art. In an example aspect, torque converter 100, 200 includes gap g2 including pathway FP arranged for fluid communication and disposed between cover 12, 112 and turbine shell 22, 122.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A housing for a torque converter comprising:
   a cover including:
      a first inner surface;
      a first outer surface opposite the first inner surface;
      a first axially extending necked portion radially outward relative to an axis of rotation and parallel to the axis of rotation, wherein the first axially extending necked portion extends in an axial direction away from a turbine of the torque converter;
   an impeller shell non-rotatably connected to the cover and having:
      a second inner surface;
      a second outer surface opposite the second inner surface;
      a second axially extending necked portion radially outward relative to the first axially extending necked portion;
   a line orthogonal to the axis of rotation passes through the first and second axially extending necked portions; and,
   a weld fixedly securing the first inner surface to the second inner surface at at least one point on the line.

2. The housing of claim 1, wherein the cover further comprises:
   a torus portion; and,
   a radial portion.

3. The housing of claim 2, wherein the cover further comprises:
   a first connecting portion connecting the first axially extending necked portion to the torus portion; and,
   a second connecting portion connecting the torus portion and the radial portion.

4. The housing of claim 1, wherein the impeller shell further comprises a clutch portion.

5. The housing of claim 1, further comprising:
   the cover further including:
      a torus portion;
      a first connecting portion connecting the first axially extending necked portion and the torus portion;
      a radial portion; and,
      a second connecting portion connecting the torus portion and the radial portion;
   the impeller shell further including a clutch portion; and,
   the first connecting portion and the clutch portion defining a gap therebetween including a pathway arranged for fluid communication.

6. The housing of claim 5, wherein the cover is of one-piece construction.

7. The housing of claim 5, wherein the impeller shell is of one-piece construction.

8. A torque converter comprising:
   the housing of claim 1, the cover further including a first torus portion;
   the turbine including a turbine shell having a third inner surface and a third outer surface and including a second torus portion; and,
   the first and second torus portions defining a gap therebetween including a pathway arranged for fluid communication.

9. A torque converter comprising:
   a cover arranged to receive torque, the cover including:
      a first inner surface; and,
      a first axially extending necked portion radially outward relative to an axis of rotation and parallel to the axis of rotation;
   an impeller shell including:
      a second inner surface;
      a second axially extending necked portion radially outward relative to the first axially extending necked portion; and,
      at least one blade fixedly secured to the impeller shell;
   a turbine including a turbine shell and at least one turbine blade fixedly secured to the turbine shell;
   a line orthogonal to the axis of rotation passing through the first and second axially extending necked portions; and
   a weld fixing the first inner surface to the second inner surface at at least one point on the line.

10. The torque converter of claim 9, wherein the first axially extending necked portion includes a first end extending in a first axial direction and the second axially extending necked portion includes a second end extending in the first axial direction, wherein the second end is radially outward relative to the first end.

11. The torque converter of claim 9, wherein the impeller shell further includes a clutch.

12. The torque converter of claim 11, wherein the turbine shell further includes a piston arranged for engagement with the clutch.

13. The torque converter of claim 12, wherein the impeller shell including the clutch is of one-piece construction; and wherein the turbine shell including the piston is of one-piece construction.

14. A torque converter comprising:
   a drive plate arranged for connecting to an engine via a stud;
   a cover fixedly attached to the drive plate and arranged to receive torque; the cover including a first axial portion parallel to an axis of rotation and disposed at a first radial distance relative to the axis of rotation and having:
      a first inner surface;
      a first distal end extending in a first axial direction to a first axial distance relative to the drive plate;
   an impeller including an impeller shell and at least one blade; the impeller shell further including a second axial portion parallel to the axis of rotation and disposed at a second radial distance greater than the first radial distance relative to the axis of rotation, and having:
- a second inner surface;
- a second distal end extending in the first axial direction to a second axial distance relative to the drive plate, the second axial distance greater than the first axial distance;

a weld arranged to fixedly securing the first inner surface to the second inner surface; and a turbine including a turbine shell and at least one blade, the turbine shell further including a turbine inner surface and a turbine outer surface opposite the turbine inner surface.

15. The torque converter of claim 14, wherein the weld is disposed in a step formed by the second distal end and the first inner surface.

16. The torque converter of claim 14 further comprising a damper wherein the first axial portion is radially outward relative to the damper.

17. The torque converter of claim 16, wherein the damper includes a centrifugal pendulum absorber, a series damper, a parallel damper, or a combination thereof.

18. The torque converter of claim 14, wherein the impeller shell includes a clutch of one-piece construction.

19. The torque converter of claim 18, wherein the turbine shell includes a piston of one-piece construction for engagement with the clutch.

20. The torque converter of claim 14, further including a gap including a pathway arranged for fluid communication disposed between the cover and the turbine shell.

* * * * *